J. V. MARTIN.
STABILIZING AND NEUTRALIZING DEVICE FOR AIRCRAFT.
APPLICATION FILED DEC. 1, 1916.
1,302,947.
Patented May 6, 1919.
2 SHEETS—SHEET 1.
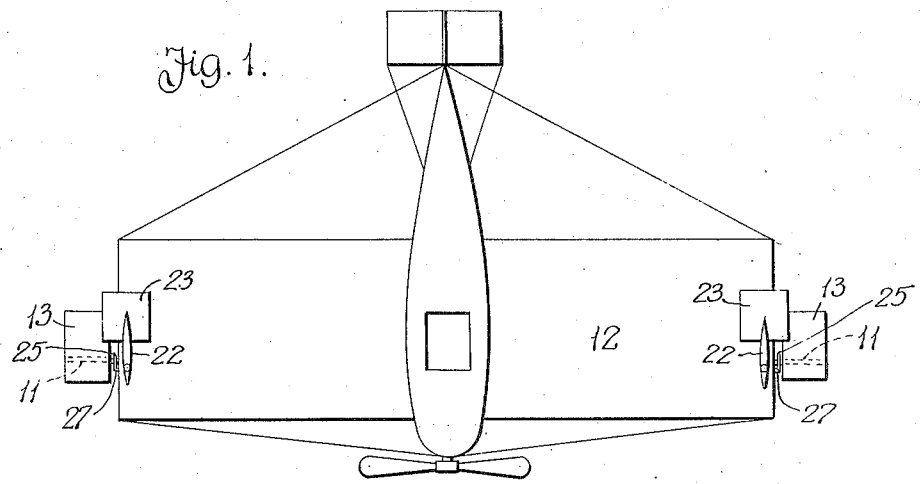
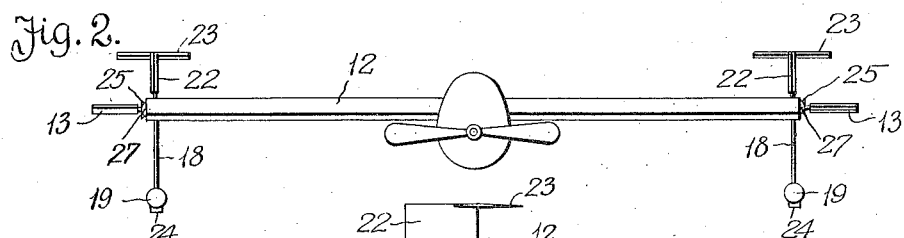
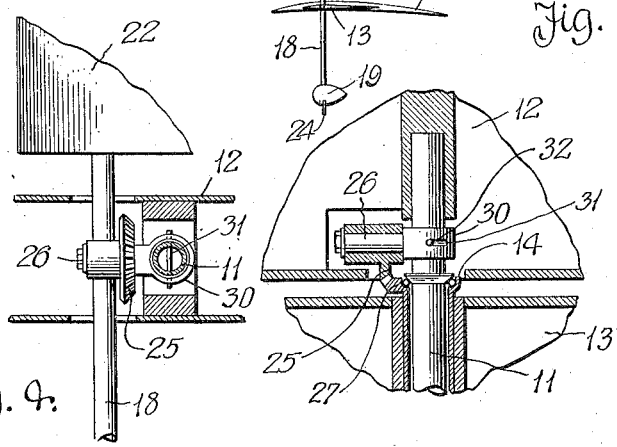
Witness
Chas. W. Stauffiger
Anna M. Dorr
Inventor
James V. Martin.
By
Barthel & Hartel
Attorneys

UNITED STATES PATENT OFFICE.

JAMES V. MARTIN, OF DETROIT, MICHIGAN.

STABILIZING AND NEUTRALIZING DEVICE FOR AIRCRAFT.

1,302,947. Specification of Letters Patent. Patented May 6, 1919.

Application filed December 1, 1916. Serial No. 134,464.

*To all whom it may concern:*

Be it known that I, JAMES V. MARTIN, citizen of the United States of America, residing at Detroit, in the county of Wayne and State of Michigan, have invented certain new and useful Improvements in Stabilizing and Neutralizing Devices for Aircraft, of which the following is a specification, reference being had therein to the accompanying drawings.

This invention relates primarily to aeroplane controls and to an improvement in the efficiency of the ailerons in maintaining the lateral balance of an air craft by neutralizing the aileron angles relative to the line of flight by causing them to be independent of the incidence of the main aerofoil of the aircraft during flight.

A further object of the invention is to locate the center of gravity of the ailerons or elevator control aerofoils at approximately the centers of pressure thereof, for zero or small angles of incidence by so distributing the weight at or near the leading edge of each as to insure this result.

As a preferred construction the ailerons and other controls are symmetrical or double cambered in longitudinal section as such contour offers less resistance than an unsymmetrical or other contour and has less movement of the center of pressure for small angles of incidence. Furthermore planes of this double-convex type are thick enough to hold or inclose their supports, and thus reduce air resistance.

With the ailerons and other controlling planes of this section or other contour having like qualities, an aim of the invention is to keep the longitudinal plane of the ailerons parallel or nearly so to the line of flight, regardless of the incidence of the main aerofoil, at all times except when the ailerons are functioning for lateral balance, so that when they are so functioning one aileron shall have a positive incidence and its companion or opposite aileron shall have an equal negative incidence. In other words, it is one purpose of the invention to cause ailerons disposed on opposite sides of an aircraft to present equal head resistance at all times during flight, so that whether they are actuated for lateral balance or not, they will not create a turning tendency in the aircraft.

In order to clearly illustrate these matters two means are shown, one manual and the other automatic, of neutralizing the angle of the ailerons to the line of flight, but any means suitable for accomplishing such neutralizing lies within the scope of the invention.

The invention consists in the matters hereinafter set forth, and more particularly pointed out in the appended claims.

Referring to the drawings,

Figure 1 is a diagrammatic plan view of an aircraft provided with ailerons and concomitant devices that embody features of the invention;

Fig. 2 is a view in front elevation, also diagrammatic, of such aircraft;

Fig. 3 is a view in end elevation of the extremity of the main aerofoil and accompanying balancing members;

Fig. 4 is a sectional view in detail of a preferred arrangement of the supporting and operating mechanism for automatic balancing control;

Fig. 5 is a sectional view in detail in plan, taken at right angles to the view of Fig. 4;

Figures 6, 7:
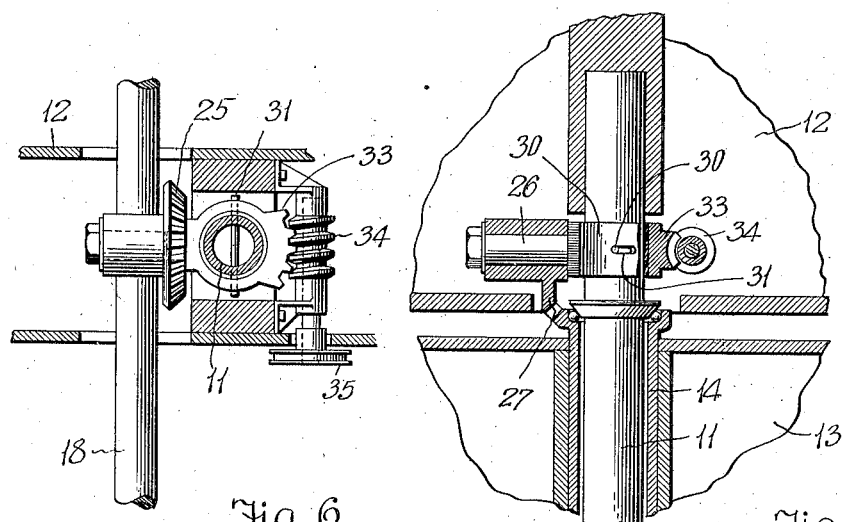
Fig. 6 is a sectional view in detail showing a preferred form of manually operable mechanism for pivotally supporting and shifting the ailerons in obtaining lateral balance.
Fig. 7 is a sectional view in detail taken at right angles to Fig. 6.
Figure 8:
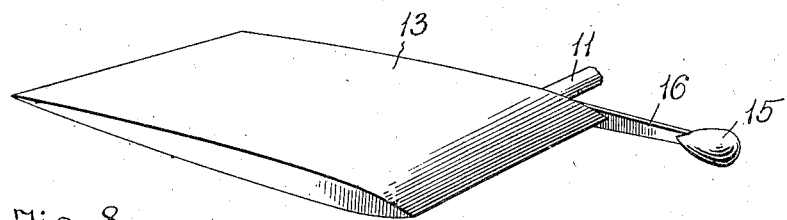
Fig. 8 is a view in detail of an aileron that is counterweighted or balanced to bring the center of gravity at or near the center of pressure.
Figure 9:
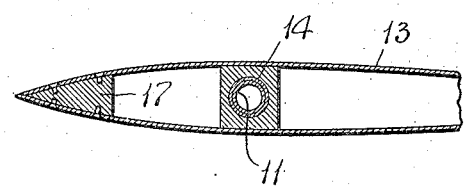
Fig. 9 is a sectional view of another form of such balanced type of aileron.

As shown in preferred form in the drawings, each extremity of an aeroplane of a well known type has a laterally extending member or non-rotatable shaft 11 that is securely anchored to the end portion of the main plane 12 or to any other suitable part of the machine. An aileron 13 is supported tiltably on the member 11 preferably by a sleeve 14 with anti-friction bearings as indicated in Fig. 5. The aileron is of a double-convex longitudinal contour or section which creates equal resistance at similar though opposite angles. It is also preferably provided with counterbalancing means either in the form of a suitably designed weight 15 on a forwardly projecting arm 16 or else a built-in counterbalance 17 contained in the forward edge portion. This counterbalancing brings the center of gravity close to the axis of motion and this axis is located at or near the main center of pressure of the aerofoil which is substantially the same through positive and negative angles of incidence of a range from zero to about nine degrees in either direction. This coincidence of the center of gravity, the center of pressure and the axis of motion which is maintained because of this design and counterbalance of the planes, is one of the features of the device.

An upright 18 is pivotally supported between its ends on the aircraft in convenient proximity to the member 11 in such manner as to swing freely in a plane transverse to the axis of the member 11 or axis of oscillation of the aileron. A weight 19 of stream line contour is attached rigidly to the lower portion of the upright or rod 18 which extends upwardly through the skin of the main plane 12 of the machine or at any rate to above the main plane to support an upright aerofoil 22 that is mounted thereon in a plane parallel to the longitudinal axis of the aircraft. A trailing vane 23 is rigidly secured at right angles to and extends rearwardly from the upright aerofoil 22, or in such fixed relation thereto at any convenient point, and is likewise of the double-convex type to provide the desired equality in head resistance throughout different and opposite angles of incidence.

Inasmuch as the head resistance above the pivot support of the upright may be greater than that of the rod and weight below the pivot, a small plane 24 may be secured below the weight transversely to the line of flight with the area thereof so adjusted that the wind resistance moment thereof is sufficient to compensate for and balance any excess moment of like character above the pivot. The placing of the plane 24 at the extremity of the weight bar where the resultant couple arm is the longest available, makes a plane of very small area effective, and thus does not materially increase the total head resistance.

The member 18 and the aileron 13 are interconnected so that outward movement of the weight causes the forward margin of the aileron to rise and a reverse movement of the weight depresses the forward part. This interconnection may take the form of a segmental gear 25 carried by a journal portion of the upright 18 in mesh with a segmental gear 27 on the bearing sleeve 14 of the aileron. A stud 26 on which this journal portion of the upright swings, has a collar or ring portion 30 that encircles the member 11 and has limited angular movement, being limited in such turning movement by a diametrically disposed pin 31 extending through segmental circumferential slots 32 in the collar.

The collar being free to turn upon the shaft 11, the weight 19 tends to maintain the rod 18 and aerofoil 22 in a vertical position by gravity, but when the line of flight deviates from the horizontal, then the trailing vane 23 influenced by the action or pressure of the air thereon, is deflected from the horizontal in which it would be held by said weight, to a position substantially neutral to the line of flight, said vane being of sufficient area to overcome the action of gravity on said weight and swing the rod 18 from its vertical position. The aileron 13 is simultaneously influenced by the action of the vane 23 and turned to a position substantially neutral to the line of flight because of the intermeshed gear segments 25 and 27. This fore or aft swing of the rod 18 turns the collar 30 upon the shaft 11 and thus swings the segment 25 about the shaft axis, turning the aileron 13 about the same axis a like amount due to the engagement of the teeth of this segment 25 with the teeth of the segment 27 fixed to the aileron sleeve 14, said segment 25 being held against turning about the axis of the stud 26 upon which it is mounted, by the action of gravity on the weight 19, which tends to prevent the rod 18 from swinging transversely of the line of flight or at right angles to the fore and aft movement thereof. The centers of pressure, gravity and motion of the aileron being substantially coincident, said aileron is easily rotated upon its support 11 during flight, and thus the resistance offered by the hanging weight to the transverse swing of the rod and consequent turning of the segment 25 upon the stud 26, is greater than the resistance offered by the air currents to the turning of the aileron, and said aileron will therefore be maintained in parallelism with the trailing vane except when the hanging weight is swung transversely to the line of flight by the lateral inclination of the main plane from the horizontal. This lateral swinging of the weight, due to the tilting of the machine in flight, turns the rod 18 upon its pivot bearing or stud 26 and as the segment 25 is integral with the bearing sleeve of the rod, said segment is rotated in mesh with the segment 27 and thus changes the incidence of the aileron.

A change in the direction of flight from the horizontal would ordinarily cause the weighted rod 18 to swing fore or aft and change the incidence of the aileron, but as the incidence of the aileron is controlled by the vane 23 influenced by the air currents to neutralize said vane to the line of flight, the aileron is also neutralized and so maintained thereby regardless of the incidence of the main plane 12 which may change without affecting the aileron, or aerofoil and its vane, or the control mechanism connecting the same, said shaft 11 which is fixed on the main plane 12, having a free limited turning movement within the collar 30 and sleeve 14. The trailing vane thus automatically neutralizes itself and its connected aileron to the line of flight regardless of the angle of incidence of the main plane or its deflection from the horizontal in ascending or descending, and therefore when the weighted rods function to change the incidence of the ailerons upon tilting of the machines or change in direction of flight, said ailerons will have equal opposite incidence and therefore both will present the same head resistance, obviating the common tendency of machines provided with ailerons, to deviate from their course due to unequal head resistance of the ailerons.

The connections which have just been described therefore act automatically to permit the aircraft to properly maintain itself in straight direction and flight regardless of whether it is progressing horizontally or ascending or descending and to bank it as on turns to prevent skidding by uptilting the outer and depressing the inner aileron on such turn.

If it is desired to effect the neutralization of the ailerons to the line of flight manually or in other words to add a manual control to the automatic device the construction shown in Figs. 6 and 7 may be employed in which the aerofoil 23 is dispensed with and a segmental worm gear 33 is applied to the sleeve 30 and a worm 34 is in mesh therewith, the latter being manipulated through a pulley 35 and a suitable flexible connection leading therefrom to the operator's station.

As a result of this construction, so long as the aeroplane is moving straight ahead whether horizontally or up or down, the aircraft is automatically maintained in the lateral horizontal without tendency toward deflection from its course but if the rudder is operated to turn the aeroplane, the skidding effect of the turn introduces an angle of incidence of the vertical aerofoils which presses them toward the center of the turn. In this they are assisted by the pendulum weights which tend to continue their motion in a direct line of flight, and will both swing toward that end of the plane which would describe the largest circle. This causes the outer aileron to take a positive angle of incidence and consequently raise the outer wing and the inner one to assume a negative angle and depress the inner wing.

Throughout all these effects, the head resistance of these controlling structures at or near the wing extremities counteract each other since the plane sections used produce equal head resistances throughout equal and opposite angles of incidence and the vane aerofoils at all times insure that they have such equal and opposite angles of incidence. The inclosing of the supporting members of the ailerons within the skins thereof, likewise reduces the head resistance materially.

Obviously, changes in the details of construction may be made without departing from the spirit of my invention and I do not care to limit myself to any particular form or arrangement of parts.

What I claim is:—

1. In an aircraft, a main sustaining plane, a supplemental stabilizing plane adjacent each extremity of the main plane, means for operating the supplemental planes to stabilize the aircraft, and means located above the horizontal plane of each supplemental plane and operatively connected thereto for neutralizing said supplemental planes to the line of flight.

2. In an aircraft, a main sustaining plane, a supplemental stabilizing plane adjacent each extremity of the main plane, means for operating the supplemental planes to stabilize the aircraft, and means located above the horizontal plane of the main plane extremities for neutralizing said supplemental planes to the line of flight.

3. In an aeroplane, a main sustaining plane, an aileron adjacent an extremity of the main plane, a vertical aerofoil operatively connected to said aileron to effect a change in the incidence thereof, and means adjacent said aileron and aerofoil adapted to neutralize the incidence of the aileron to the line of flight.

4. In an aeroplane, an aileron, a swinging member operatively connected to said aileron to effect changes in the incidence thereof, and an aerofoil adapted to operate said swinging member to neutralize the incidence of the aileron to the line of flight.

5. In an aeroplane, a sustaining wing, an aileron near each wing extremity, a gravity member operatively connected to each aileron, a vertical aerofoil operatively connected to each aileron, and means adapted to operate each gravity member to neutralize the incidence of said ailerons to the line of flight.

6. In an aeroplane, an aileron, an upright aerofoil connected thereto to effect a change in the incidence thereof, an aerofoil in a plane approximately at right angles to said upright aerofoil adapted to neutralize the incidence of said aileron.

7. In an aeroplane, an aileron, and two ancillary aerofoils arranged substantially at right angles to each other and operatively connected to said aileron to control the incidence thereof.

8. In an aeroplane, an aileron, a pivoted pendulum arm operatively connected thereto to effect a change in the incidence thereof, an upright aerofoil disposed above the axis of said arm and connected thereto to operate therewith, and a lateral aerofoil operatively connected to said arm to neutralize the incidence of the aileron to the line of flight.

9. In an aeroplane, a main plane, an aileron on each lateral extremity thereof, and means positioned above said main plane extremities and ailerons adapted to be operated by airs local to said extremities for neutralizing the incidence of said ailerons to the line of flight.

10. In an aeroplane, an aileron with the mass thereof so disposed as to place its center of gravity at approximately its axis of support, automatic means for effecting a change in the incidence of said ailerons, and means operatively connected to said automatic means for automatically neutralizing said aileron to the line of flight.

11. In an aeroplane, having a sustaining plane, an aileron near each extremity of said plane with the mass thereof so disposed as to place its center of gravity at approximately its center of pressure throughout small angles of incidence thereof, and means operated by airs local to said extremities for effecting a change in the incidence of said ailerons to neutralize said ailerons to the line of flight.

12. In an aeroplane, a main plane, a pivoted aileron, and a horizontally disposed aerofoil so positioned as to be substantially free from air interference of the main plane and aileron and operatively connected with said aileron to neutralize the incidence thereof to the line of flight.

13. In an aeroplane, an aileron, a pivoted member for automatically controlling the incidence of said aileron, and a horizontally disposed vane on said member for neutralizing the incidence thereof to the line of flight.

14. In an aeroplane, an aerodynamic stabilizer including ailerons, means operated by airs local to said stabilizer for automatically changing the incidence of said ailerons to effect lateral balance of the aeroplane, and means operated by airs local to said stabilizer for automatically neutralizing said ailerons to the line of flight.

15. In an aeroplane, ailerons for effecting a lateral balance of the aeroplane, and means including a plurality of aerofoils adjacent each lateral extremity of the aeroplane operated by variations in the incidence and velocity of air currents local to the aeroplane lateral extremities for effecting changes in the incidence of said ailerons and for neutralizing the same to the line of flight.

16. In combination with aeroplane extremities, ailerons, two auxiliary aerofoils adjacent each aileron and operatively connected thereto to effect a change in the incidence thereof, one for effecting lateral balance of the aeroplane and the other to neutralize the ailerons to the line of flight.

17. In an aeroplane, an aileron, a normally vertical rod pivoted to swing upon two axes extending transversely of the rod axis a normally horizontal aerofoil and a normally vertical aerofoil on said rod, and operative connections between said rod and aileron.

18. In an aeroplane, the combination with an aileron, of a horizontal aerofoil disposed rearwardly of the support of said aileron, a vertical aerofoil, and means operatively connecting said aileron and aerofoils, whereby a movement of said aerofoils produces an upward movement of the leading edge of said aileron.

19. In an aeroplane, the combination with a pivoted aileron, of an aerofoil, a member adapted to oscillate in planes parallel to the longitudinal and transverse axes of the aeroplane, means operatively connecting said member and aileron, and means operated by local air pressures to swing said member in one of its planes of oscillation by said aerofoil to effect a neutralization of said aileron to the line of flight.

20. In an aeroplane, the combination of a sustaining plane, an aileron adjacent each extremity of said plane, automatic means adjacent each aileron operated by lateral tilting movement of said plane for effecting a change in the incidence of said ailerons to balance the aeroplane laterally, and means operated by airs local to the plane extremities for operating said automatic means to neutralize said ailerons to the line of flight and equalize head resistance of said ailerons when operated to effect lateral balance of said aeroplane.

21. In an aeroplane, an aileron, a normally vertical rod pivoted to swing upon an axis to effect a change in the incidence of said aileron, and upon another axis to neutralize the incidence of said aileron to the line of flight, and an aerofoil on said rod to swing the same upon the last mentioned axis.

22. In an aeroplane, an aileron, a normally vertical member pivoted to swing upon one axis to effect a change in the incidence of said aileron and upon another axis to neutralize the incidence of said aileron to the line of flight, and means operated by airs local to said aileron for swing said member upon its last mentioned axis.

In testimony whereof I affix my signature in the presence of two witnesses.

JAMES V. MARTIN.

Witnesses:
   ANNA M. DORR,
   C. R. STICKNEY.